United States Patent [19]

Marie et al.

[11] Patent Number: 5,046,091
[45] Date of Patent: Sep. 3, 1991

[54] EXTENDED DEFINITION TELEVISION TRANSMISSION SYSTEM

[75] Inventors: Gérard Marie, Santeny-Villecresnes; Olivier Chantelou, Paris, both of France

[73] Assignee: U.S. Philips Corporation, New York, N.Y.

[21] Appl. No.: 471,172

[22] Filed: Jan. 26, 1990

[30] Foreign Application Priority Data

Jan. 27, 1989 [FR] France .................. 89 01020

[51] Int. Cl.$^5$ ............................ H04N 7/167
[52] U.S. Cl. ...................... 380/14; 358/12; 358/141
[58] Field of Search .............. 358/12, 141; 380/14

[56] References Cited
U.S. PATENT DOCUMENTS 4,908,697 3/1990 Tsinberg et al. ................. 358/12

Primary Examiner—Thomas H. Tarcza
Assistant Examiner—David Cain
Attorney, Agent, or Firm—Michael E. Marion

[57] ABSTRACT

Television picture transmission stage in which besides means for transmitting at least one picture characteristic extension video signal via at least one transmission path, means for scrambling at least a part of said extension signal or signals, and receiving stage comprising corresponding receiving and descrambling means. These stages are particularly intended for a television picture transmission system in which one or more video signals for extending the aspect ratio of the picture and the video signals for extending the horizontal and vertical definition of the said pictures are transmitted and transferred superposed on the conventional video signals which correspond to the original pictures, said extension signals having been submitted before transmission to a cyclic permutation from a cut point defined for each line with the aid of a pseudorandom sequence generator.

32 Claims, 2 Drawing Sheets

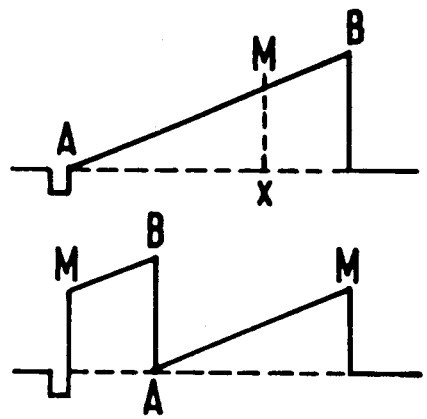
FIG.1
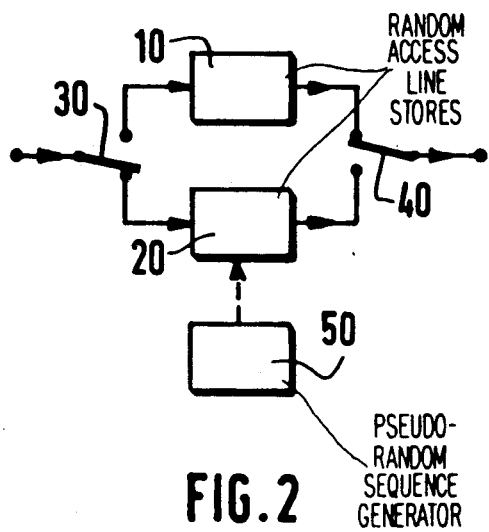
FIG.2
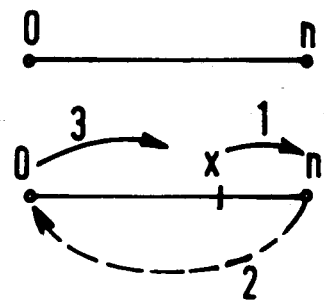
FIG.3(a)
FIG.3(b)
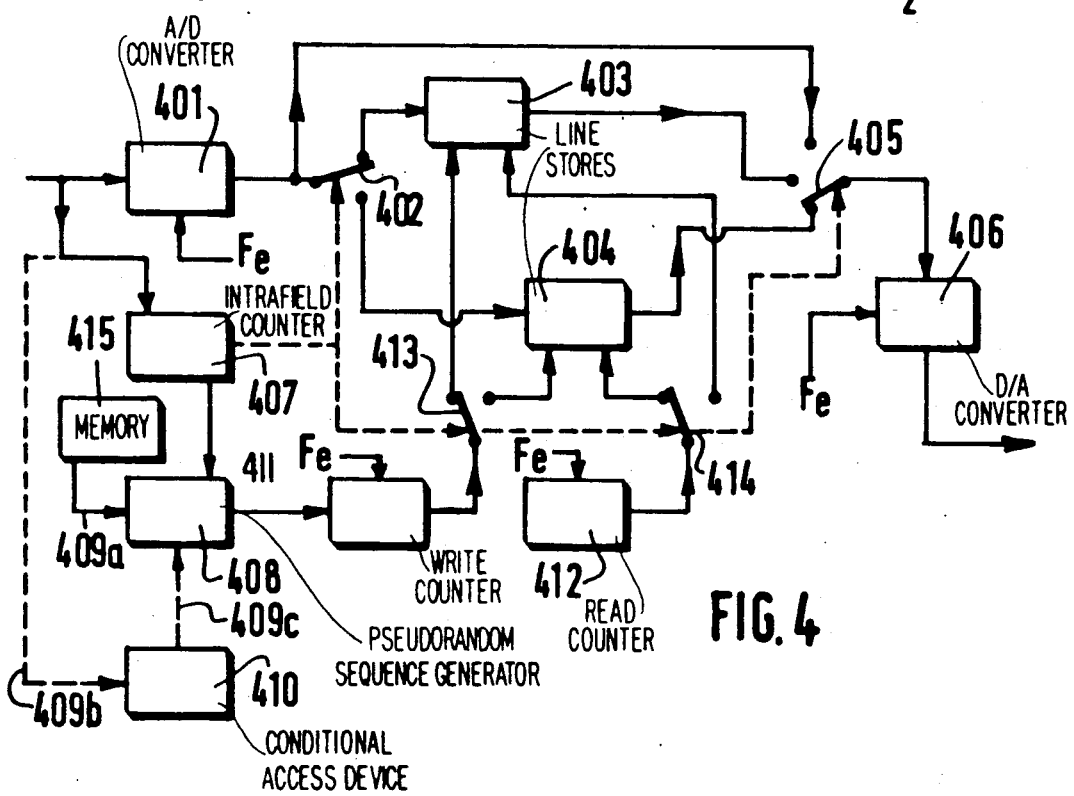
FIG.4

EXTENDED DEFINITION TELEVISION TRANSMISSION SYSTEM

BACKGROUND OF THE INVENTION

The present invention relates to a television picture signal transmission stage having means for transmitting at least one picture characteristic extension video signal via at least one transmission path.

The invention also relates to an extended definition television transmission system including such a transmission stage as well as a receiving stage for such a transmission system.

In Europe, the high definition approach in terms of television provides a so-called HDMAC standard which is compatible with the MAC standard which will shortly be employed in direct broadcast via satellite, and which ultimately might also be used in terrestial broadcasting. During the first few years of broadcasting in accordance with this HDMAC standard, a population of high definition television receivers will be formed which must also recover pictures transmitted in accordance with the PAL and SECAM standards.

Because of the very large differences in quality between these last-mentioned PAL or SECAM and HDMAC pictures, it would be recommendable that, in Europe, the PAL and SECAM standards are given an extended resolution, for example by means of procedures similar to those planned in the United States within the scope of the NTSC standard.

In the United States, the FCC actually requires the extended definition television, denoted EDTV ("Extended Definition Television") to be compatible with the existing NTSC standard. The transmitted signal would then occupy either the same 6 MHz wide channel as the actual NTSC standard, or a wider channel (9 MHZ or 12 MHZ, in a continuous channel or in two separate channels), but it is to be received in a compatible manner by existing receivers arranged for the NTSC standard.

In an extended standard it is, more precisely, provided that the following information is added to the signals which are at present transmitted in accordance with the existing NTSC, PAL OR SECAM standards:

a) signals corresponding to the right-hand and left-hand edges of the picture, in such a manner as to increase the aspect ratio of the picture from 4/3 to 16/9;

b) signals corresponding to the increase of the resolution of the picture in the horizontal direction;

c) signals corresponding to the increase of the resolution of the picture in the vertical direction, and which can optionally be combined with the signals (b) to form a bidimensional information;

d) signals corresponding to the broadcast in sound channels in digitally encoded form, with a quality which is near the quality of laser-scanned audio discs (or compact discs).

In order to transmit the above additional information, the place which is temporarily left free during line and field blanking periods is not sufficient. It is therefore provided that these information components are also transmitted through the following three paths:

(A) on a carrier having the same frequency as the picture carrier, but quadrature modulated therewith;

(B) on a subcarrier having a frequency near the subcarrier frequencies used for transmitting the chrominance, but utilizing a spatio-temporal filtering (field comb filter) at the transmitting and receiving ends in such manner that the two information components are separated;

(C) optionally, in a 3 or 6 MHz wide channel which may be located just above the band occupied by the video signals, or just below this band, or which may be completely separate, this third path then occupying one of the so-called forbidden channels, which are prohibited for terrestial broadcasts to avoid interferences due to the lack of selectivity of the receivers (especially of obsolete receivers).

In new generation receivers, precise detection and filtering methods (synchronous detection, comb filter, improved picture frequency rejection, more abrupt IF filter) render it possible to reduce to a neglectable level the interferences between the conventional video signal and the additional signals (a), (b), (c), (d) transmitted through the paths (A), (B), (C). In contrast thereto, in existing receivers and more specifically in older models, significant interferences will be produced which will result in a degradation of the quality of the compatible picture received by these receivers.

These interferences will be most annoying when they correspond to picture portions which are not correlated with the conventional video picture received, for example at the edges, or when they give rise to other pictures resulting from interferences between the forbidden channels and the existing channels. Actually then, superposed on the conventional video picture, a ghost picture will appear (possibly reduced to its contours), which is more annoying because as the aspect ratios and the motion they restore are not correlated with the picture one wants to receive.

Applicants have appreciated that the signals (d) which are transmitted in the digital form are the less annoying since they will appear as incoherent noise with respect to the compatible picture and that a portion of the signals (b) and (c), the portion corresponding to the information originating from the picture portion that is transmitted in the original standard in the ratio 4/3, is fully correlated with the compatible picture and thus could only produce less annoying interferences if it is transmitted in synchronism with this compatible picture. In contrast thereto, the signals (a) and the portions of the signals (b) and (c) corresponding to the edges of the picture will always be very annoying.

The problem to be solved is consequently the problem of noticeably reducing the disturbances caused by the existence of these interferences.

SUMMARY OF THE INVENTION

The invention relates, to a transmission stage which is characterized in that it comprises means for scrambling at least a part of said extension video signal or signals.

According to the solution proposed, the invention relates also to a transmission stage which is characterized in that it includes horizontal scrambling means for at least one of the said signals (a), (b), (c) and/or at least a portion of one or the other of said signals (a), (b), (c).

Thanks to this system structure, the signals (a), (b), (c), or those of these signals, or in a general manner the portion of this signal or these signals, which have been scrambled, are given an erratic appearance, and are no longer correlated with the original picture with normal definition. Consequently, the interferences which might subsist between these signals and the original video signals corresponding to the normal picture have an incoherent structure and become less perceptible.

In the preferred embodiment of the invention, all the extension signals (a), (b), (c) are submitted to the scrambling provided in the system. However, it may be advantageous to reduce the complexity of this system by reducing the required storage capacity. In that case, a fraction of the extension signals are excluded from the scrambling operation, for example by excluding from this scrambling operation that fraction of the signals (b) and (c) that corresponds to the picture center, that is to say to the normal picture without extension of the definition.

A particularly well-adapted scrambling procedure includes effecting on each line a cyclic permutation from a variable address x defined by a pseudorandom sequence generator. The picture actually becomes completely decorrelated in the horizontal direction, accompanied by a complete disappearance of the structures and the initial contours. Consequently, any interference between one of the signals (a), (b), (c) and the compatible picture will appear as noise in the received picture, which forms a disturbance which degrades this picture in a manner which is clearly less perceptible than a disturbance in response to interferences caused by a ghost picture.

Preferably, the address x of the signal cut point on each line is given by a pseudorandom p-bit word produced by the pseudorandom sequence generator which operates at a frequency which is at least equal to p times the line frequency. If, for example, this frequency is equal to 8 times the line frequency, a 8 bit pseudorandom word will be available during each line period, which renders it possible to choose the address of the signal cut point from 256 distinct positions $x_0$ to $x_{n-1}$. For the sake of simplicity, it is preferable to take this operating frequency equal to p times, or a multiple of p times, said line frequency.

Scrambling by means of cyclic permutation in each line from the pseudorandom address will not decorrelate the picture in the horizontal direction. Put differently, this scrambling operation only converts the spectrum of the picture into a noise spectrum for frequencies higher than half the line frequency, i.e. approximately 8 kHz. This may be sufficient when the picture includes highly contrasted horizontal bands, for example a horizon separating the earth from a very bright sky.

To improve the efficiency of the scrambling for such situations, it can be made more complicated by effecting a pseudorandom mixing operation of all the lines or part thereof. It is, for example, possible to employ for the mixing operation a cyclic permutation within a group of consecutive lines, by a planning of the capacity of the corresponding memory which enables this group of lines to be written and read. The variable address y of the line, from which the sequence in which the lines are transmitted is modified can be obtained in the form of a number b of bits supplied by a pseudorandom generator, such that $2^b$ is less than or equal to the number L of lines.

The b bits can be supplied by the same pseudorandom sequence generator as that supplying the p bits which determine the cut address in each line. It is, for example, possible not to change the operating frequencies of the generator and to choose the b bits of the mixing address y from among the $L \times p$ bits produced by the generator in L line periods. It is also possible to have the generator operate at a higher frequency, but always a multiple of the line frequency, for example at a frequency equal to $(p+1)$ times the line frequency and to use on the one hand p bits during all the line periods to determine the cut address x, and on the other hand b bits s taken every L line periods from the additional L bits produced by the generator and not used by the addresses x, to determine the address y of the start of the modification of the line transmission sequence.

For the sake of simplicity of the system, the pseudorandom sequence generator can be synchronized with the picture or field frequency (25, 30, 50 or 60 Hz), but the parasitic interference will then appear as a spatial noise with a fixed temporal structure and will consequently be perceptible. In order to limit or suppress this residual fault, it should then be preferred to provide that the pseudorandom sequence occurs over a large number M of fields (more than a hundred, for example), which gives any parasitic interference a noise structure which is both spatial and temporal. It is then sufficient to add, during transmission, for the pseudorandom sequence generator at the receiver end, a synchronizing signal which can easily be introduced in a field blanking period.

The scrambling described so far is basically intended to suppress the disturbing effects caused by interferences. In that case, at each synchronization instant of the pseudorandom sequence generator, the same load word is used, which is well known, at the transmitter end and at the receiver end. It is also possible to make the access to the descrambling of the extended definition signals conditional. To achieve this, it is sufficient to ensure that the generator load word changes periodically and that it is only communicated to the receiver by means of a conditional access procedure. Thus it is possible to reserve only for those subscribers who have paid a fee or have obtained an authorization, the additional service of the increase in aspect ratio and the improvement in the definition of the picture.

It should also be noted that scrambling by cutting and cyclic permutation of the line signals produces in the total transmitting and receiving assembly a delay equal to two line periods in the signal submitted to this scrambling operation, compared with a non-scrambled signal. Similarly, when a scrambling by vertical mixing of L lines is added to the horizontal scrambling by cutting and cyclic permutation, a delay equal to 2L line periods is obtained. So as to simplify the decoder of the extended definition receiver to the maximum extent, it is then sensible to delay all the non-scrambled signals in the decoder located at the transmitter end, and more specifically the compatible signal, by a delay equal to 2L line periods. A number of 2L line stores are, for example, used for this purpose, it being obvious that L can of course be equal to 1, which corresponds to the preceding case in which no vertical mixing of the lines was used.

According to the invention, when at least one picture characteristic extension video signal has been transmitted after scrambling in a transmission stage as defined above, and especially in a transmission stage for a picture transmission system in which the extension video signal or signals has or have been transmitted as indicated above, the receiving stage is then such that it, provided with means for receiving said signal or signals, also comprises means for descrambling at least a fraction of said extension signal or signals.

In a preferred embodiment, this receiving stage, intended for a television transmission system in which one or more video signals for extending the aspect ratio of the picture and the video signals for extending the horizontal and vertical definition of the said pictures are transmitted and transferred superposed on the conventional video signals which correspond to the original pictures, said extension signals having been submitted before transmission to a cyclic permutation from a cut point defined for each line with the aid of a pseudorandom sequence generator, is more particularly characterized in that it includes a decoding device comprising:

(a) a first and a second memory arranged in parallel for writing a line in one of these memories during reading of the line previously entered into the other memory and vice versa, the extension signals received being written from the address x corresponding to the said cut point belonging to each line, thereafter returning to the address corresponding to the beginning of the line signal when the end of the line has been reached, and continuing in this way until said address x has been reached again;

(b) a write counter and a read counter, which are controlled at the line frequency;

(c) a descrambling module including a pseudorandom sequence generator and intended to control said write counter.

BRIEF DESCRIPTION OF THE DRAWINGS

These and other (more detailed) particulars and advantages of the invention will now become more apparent from the following description which is given by way of non-limitative example with reference to the accompanying drawings, in which FIG. 1 shows the scrambling principle of a picture line signal;

FIGS. 2, 3a, 3b illustrate the mode of operation of the system on transmission,

FIG. 4 shows an embodiment of a decoder according to the invention;

DETAILED DESCRIPTION OF THE INVENTION

Figure 5:
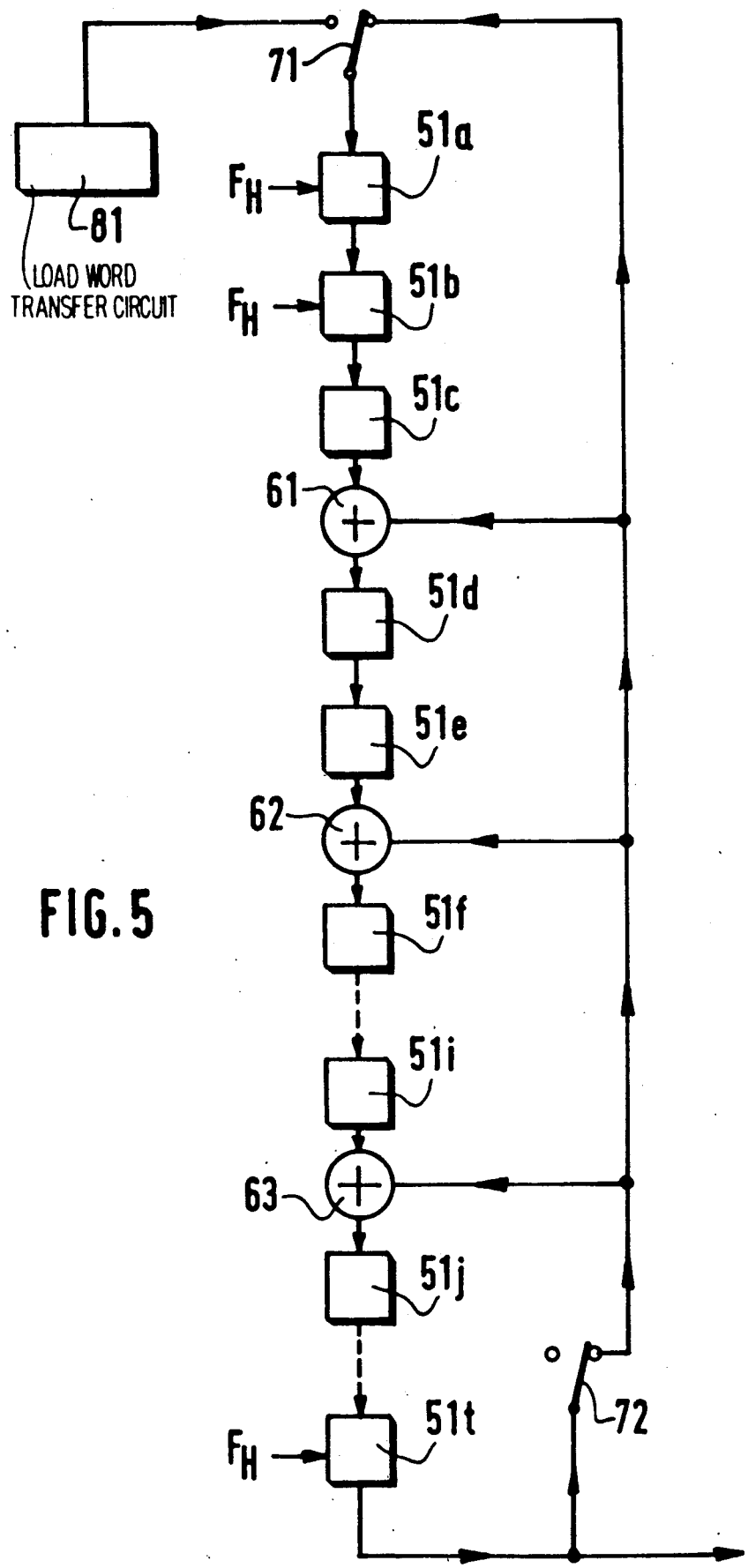
FIG. 5 shows an example of the pseudorandom sequence generator producing a maximum synchronization waiting period of approximately 5 seconds before making the receiver operative.

In the foregoing is was stated that the problem to be solved is the presence of disturbances caused by the coherence between the interferences which are produced together with the useful signals. To give these interferences an incoherent structure, the scrambling operation of the cyclic permutation type applied to each line, as prescribed by the UER (Union Europeenne de Radiodiffusion) in their document SPB 284 and SPB 352 for the broadcasting of signals of the MAC type has been adopted.

FIG. 1 illustrates the principle of this scrambling operation by cutting the signal (here AB) from a picture line in a point M of a random position (at the address x) and interchanging the two signals thus formed. FIGS. 2, 3a and 3b illustrate the mode of operation of the system on transmission: upstream of a picture encoding device of a conventional type two random-access line stores 10 and 20 and two change-over switches 30 and 40 controlled at the line frequency, are added. While one of these stores is in the write mode with normal storage (FIG. 3a) of the current signal from the address 0 up to the last address n, the other store is in the read mode, but starting from the address x (FIG. 3b) produced by a pseudorandom sequence generator 50 up to the address n, thereafter for the address 0 to the address x-1. The latter signal, such as it is read, is processed to obtain the signals (a), (b), (c) transmitted via the paths (A), (B), (C).

FIG. 4 shows an embodiment of a decoder at the receiving end. In the embodiment described, this decoder includes an analog-to-digital converter 401, followed by a two-position change-over switch 402, by means of which it is possible to connect the output of the converter either to a first pseudorandom line store 403 or to a similar second store 404 for writing the current line. At the output of these stores, a three-position change-over switch 405 is provided whose output is connected to the input of a digital-to-analog converter 406 intended to supply the decoded line signals. According to its position, the change-over switch 405 provides that either the output of one or the other of these stores is conveyed to the converter 406, or directly from the output of the analog-to-digital converter 401. The converters 401 and 406 are controlled at a sampling frequency $F_c$.

The decoder also includes an intrafield counter 407 which within each field controls the number of times the change-over switches 402 and 405 switch. This counter is connected to a pseudorandom sequence generator 408 intended to supply the information by means of which it is possible to define the cut address x, i.e. the point at which writing that memory of the two memories 403 and 404 that is in the write mode, starts. Actually, the decoder operates in symmetry with the encoder : writing the signal received is effected from the address x up to the address x-1, as in FIG. 3b, and in contrast thereto reading is effected from the address 0 to the address n, as in FIG. 3a. The pseudorandom sequence generator 408 receives its load word either directly from a memory 415 which is for example of the read-only type (solid connecting line 409a) as this word is always the same and is well-known, or via a conditional access device, 410 the line 409a then being replaced by the broken-line connecting lines 409b and 409c. Finally, the decoder includes a write counter 411 and a read counter 412, and these two counters each alternately control first one and then the other of the two line stores 403 and 404, via the change-over switches 413 and 414 one of which controls the link to the other store and vice versa. These write and read counters 411 and 412 are controlled at the line frequency $F_1$.

The signals (a), (b), (c) to extend the aspect ratio or to extend the resolution, may contain a plurality of components, which generally results in the transmission of several signals of different origins through certain paths (A), (B), (C). For that purpose it is possible to employ frequency-division multiplexing using, for example, several subcarriers in the path (C) or several subcarriers in the path (B), which generally entails a filtering problem to effectively separate the various transmitted components. A more effective solution consists in the use of time-division multiplexing by successively transmitting the different components on the same carrier and/or subcarrier. In this case it is an object of the invention to utilize the same memories to effect at the same time the decoding and the demultiplexing of the signals transmitted on the same carrier and/or subcarrier.

An embodiment of a decoder/demultiplexer can be derived from the circuit diagram shown in FIG. 4. In this circuit diagram it is actually sufficient to divide the memories 403 and 404 in as many sub-memories as there are different components transmitted on the same carrier or subcarrier, to effect the sequential writing of the signals received in these sub-memories in the sequence in which they are despatched and by starting at the respective addresses x, and to effect reading of the sub-memories simultaneously or in the sequence required for the restitution of the signals, starting at the respective addresses 0 of each sub-memory. This generally leads to the use of different write and read frequencies of the memories, as is common practice in the decoding of signals which have been submitted to time-division multiplexing, such as, for example, MAC signals.

The pseudorandom sequence generator 50 can more specifically be of the linear feedback shift register type, the register then having, for example, a length of 20 cells when one wants this generator to supply 8 to 10 bits at every line period and this sequence to proceed without repetition for approximately 5 seconds. Beyond such a duration, the waiting time for the synchronization when the television receiver is started could, actually, appear to be too long. In this example, which is however not limitative, the generator polynomial of the order 20 can be chosen to be primitive and irreducible to provide that the sequence is of a maximum length $(2^{20}-1)$:the polynomial $1+x^3+x^5+x^9+x^{20}$, for example, is retained, which corresponds to the pseudorandom sequence generator shown in FIG. 5, the 20 cells controlled by the clock frequency $F_H$ being denoted by the reference numerals 51a to 51t and being completed by modulo 2 adders 61 to 63, change-over switches 71 and 72, and a load word transfer circuit 81 of the generator 50. The two change-over switches 71 and 72 are in the lefthand position during loading of the generator from a 20 bit word which is stored in the circuit 81 and in the righthand position during the unwinding of the pseudorandom sequence.

We claim:

1. An apparatus for use in an extended definition television system wherein a television picture comprising a conventional television signal and a picture characteristic extension video signal comprising a plurality of line signals are derived from a television source signal, said apparatus comprising:
   (a) means for scrambling said picture characteristic extension video signal so as to form a scrambled signal, said scrambling means comprising:
   a first pseudorandom sequence generator for supplying for each line signal an address x, where x is an integer, which determines a position of a signal cut point from which a cyclic permutation can be effected on said line signal; and
   first and second line stores for alternatingly writing a current line signal into said first and second line stores from an initial position of said first and second line stores, and for alternatingly reading a previous line signal from said second and first line stores, respectively, from said signal cut point position; and
   (b) means for transmitting said scrambled signal as part of said television picture.

2. The apparatus as claimed in claim 1, wherein the operating frequency of the pseudorandom sequence generator is at least equal to p times the line frequency, where p is an integer, to supply during a line period a pseudorandom p bit word representing the address x of the cut point of a corresponding line signal.

3. The apparatus as claimed in claim 1 wherein the operating frequency of the pseudorandom sequence generator is equal to at least p times the line frequency, where p is an integer.

4. The apparatus as claimed in claim 1 wherein it further comprises means for vertically scrambling the picture by cyclic permutation of the positions of the lines.

5. The apparatus as claimed in claim 4, wherein said plurality of line signals comprises at least L line signals corresponding to L line addresses, where L is an integer, and wherein said vertical scrambling means comprise
   a second pseudorandom sequence generator for supplying an address y, where y is an integer, chosen from among the L line addresses; and
   first and second groups of L line stores including said first and second line stores, respectively, for alternatingly writing L current line signals into said first and second groups of L line stores from said first and second lien stores, respectively, in a given order, and for alternatingly reading L previous line signals from said second and first groups of L line stores, respectively, from said address y in an order different from said given order.

6. A transmission stage as claimed in claim 4 wherein it comprises means for delaying the signals which were not submitted to the scrambling operation by 2L line periods, the number L being equal to 1 in the absence of vertical line scrambling.

7. The apparatus as claimed in claim 4, wherein said vertical scrambling means include at least a second pseudorandom sequence generator and 2(L-1) line stores where L is an integer, these 2(L-1) stores being intended for association with first and second memories in such a manner that said first memory is used for the writing of L picture lines of said current signal and said second memory is sued for the reading of these lines said reading being realized in accordance with a sequence of lines having an order different from a normal order and resulting in a pseudorandom modification of this normal order from an address y chosen from among the L line addresses considered, where y is an integer.

8. The apparatus as claimed in claim 7, wherein said modification of the transmission sequence is a cyclic permutation.

9. The apparatus as claimed in claim 8, wherein the L lines are consecutive lines and in that said cyclic permutation is realized from address y where y is in the range of 0 to L-1 and is produced by said second pseudorandom sequence generator in the form of a b-bit word, where b is an integer, such that $2^b$ is at most equal to L.

10. The apparatus as claimed in claim 7 wherein claims the first and second pseudorandom sequence generators are combined into one signal pseudorandom sequence generator for supplying at the same time the cut address x of the line signal and the address y of the beginning of the modification of the transmission of the relevant L lines.

11. The apparatus as claimed in claim 10, wherein said address y is obtained from b bits chosen from among the L times p bits produced by said pseudorandom sequence generator in L line periods, where b is an integer.

12. The apparatus as claimed in claim 10, wherein the operating frequency of the pseudorandom sequence generator is equal to (p+1) times the line frequency, in that the cut address x is supplied by said generator from the p bits supplied during all the line periods, and in that the address y of the start of the transmission sequence modification is supplied by said generator from the bits chosen during all the L line periods from among the L additional bits supplied by this generator and which are not used for the cut address x.

13. An apparatus for use in an extended definition television system wherein a television picture comprising a conventional television signal and a picture characteristic extension video signal are derived from a television source signal, said conventional television signal having a first aspect ratio and said television source signal having a second aspect ratio which is larger than said first aspect ratio, and wherein said picture characteristic extension video signal provides information relating to the difference between said first and second aspect ratios, said apparatus comprising:
   (a) means for scrambling said picture characteristic extension video signal so as to form a scrambled signal; and
   (b) means for transmitting said scrambled signal as part of said television picture.

14. The apparatus of claim 13, wherein said scrambled signal is provided on a second carrier modulated in quadrature with said picture carrier.

15. The apparatus of claim 13, said television picture further comprises a chrominance carrier, and wherein said scrambled signal is modulated on a second subcarrier and said second subcarrier is separated from said chrominance subcarrier.

16. The apparatus of claim 13, wherein said scrambled signal is transmitted on an additional channel.

17. An apparatus for use in an extended definition television system wherein a television picture comprising a picture carrier, a conventional television signal and a picture characteristic extension video signal are derived from a television source signal, said picture characteristic extension video signal providing information for extending the horizontal resolution of said conventional television signal, said apparatus comprising:
   (a) means for scrambling each of a plurality of liens of said picture characteristic extension video signal so as to form a scrambled signal; and
   (b) means for transmitting said scrambled signal as part of said television picture.

18. The apparatus of claim 17, wherein said scrambled signal is provided on a second carrier modulated in quadrature with said picture carrier.

19. The apparatus of claim 17, and wherein said scrambled signal is modulated on a second subcarrier and said second subcarrier is separated from said chrominance subcarrier.

20. The apparatus of claim 17, for use in a system wherein said conventional television signal is transmitted over a first channel and said wherein said scrambled signal is transmitted on an additional channel.

21. An apparatus for use in an extended definition television system wherein a television picture comprising a picture carrier a conventional television signal and a picture characteristic extension video signal are derived from a television source signal, said picture characteristic extension video signal providing information for extending the vertical resolution of said conventional television signal, said apparatus comprising:
   (a) means for scrambling each of a plurality of lines of said picture characteristic extension video signal so as to form a scrambled signal; and
   (b) means for transmitting said scrambled signal as part of said television picture.

22. The apparatus of claim 21, wherein said scrambled signal is provided on a second carrier modulated in quadrature with said picture carrier.

23. The apparatus of claim 21, wherein said television picture comprises a chrominance carrier, and wherein said scrambled signal is modulated on a second subcarrier and said second subcarrier is separated from said chrominance subcarrier.

24. The apparatus of claim 21, for use in a system wherein said conventional television signal is transmitted over a first channel and wherein said scrambled signal is transmitted on an additional channel.

25. An apparatus for transmitting a television picture comprising a conventional television signal and a first picture characteristic extension video signal comprising aspect ratio information, a second picture characteristic extension video signal comprising information for extending the horizontal resolution of said conventional television signal, and a third picture characteristic extension video signal comprising information for extending the vertical resolution of said television picture, said apparatus comprising:
   (a) means for scrambling at least one part of at least one picture characteristic extension video signal; and
   (b) means coupled to said scrambling means, for transmitting at least one picture characteristic extension video signal over at least one transmission path.

26. The apparatus of claim 25, wherein said scrambling means comprises means for scrambling said first, second and third picture characteristic extension video signals.

27. The apparatus of claim 25, wherein said scrambling means comprises means for scrambling said first picture characteristic extension video signal and at least part of said second and third picture characteristic extension video signals.

28. A receiver for use in a system for transmitting and receiving a television picture comprising a conventional television signal and at least one scrambled extension signal providing information for extending at least one picture characteristic of said conventional television signal, said at least one scrambled extension signal comprising a plurality of lines each having been processed using a cyclic permutation process prior to transmission wherein a cut point having an address x is determined, where x is a number chosen by a first pseudorandom sequence generator, said receiver comprising:
   (a) means for receiving said television picture; and
   (b) means for descrambling said lines of said scrambled extension signal.

29. The receiver described in claim 28 wherein said descrambling means comprises:
   (a) first and second memories arranged in parallel wherein a first received line is written into said first memory while a previously received line is read from said second memory, each of said received lines being written from its respective address x which corresponds to its respective cut point;
   (b) a write counter and a read counter which are controlled at a line frequency; and (c) a descrambling module comprising a second pseudorandom sequence generator controlling said write counter.

30. A receiver as claimed in claim 29 wherein said first and second pseudorandom sequence generators are synchronized.

31. A receiver as claimed in claim 30, wherein said television picture comprises a plurality of fields and said first and second pseudorandom sequence generators are synchronized by loading an identical word into each generator during each of said fields in the form of a synchronizing signal situated in a field blanking period.

32. An apparatus for use in an extended definition television system wherein a television picture comprising a conventional television signal and a picture characteristic extension video signal are derived from a television source signal, said apparatus comprising:

(a) means for scrambling said picture characteristic extension video signal so as to form a scrambled signal, wherein said scrambled signal comprises first portions of said television source signal not included in said conventional television signal and wherein said conventional television signal is transmitted in synchronism with said first portions; and (b) means for transmitting said scrambled signal as part of said television picture.

* * * * *